United States Patent [19]
Mallangi et al.

[11] Patent Number: 6,039,986
[45] Date of Patent: Mar. 21, 2000

[54] FORTIFICATION OF FOODSTUFF

[75] Inventors: Chandrasekhar R Mallangi, New Milford, Conn.; Alexander A. Sher, Rockville, Md.; Eileen Carol Fuchs, Gaylordsville, Conn.; Dharam Vir Vadehra, New Milford, Conn.; Elaine Regina Wedral, Sherman, Conn.

[73] Assignee: Nestec S.A., Vevey, Switzerland

[21] Appl. No.: 09/113,401

[22] Filed: Jul. 10, 1998

[51] Int. Cl.⁷ .................................................. A23L 1/304
[52] U.S. Cl. ........................ 426/74; 426/522; 426/573; 426/575; 426/580; 426/590; 426/660
[58] Field of Search ............................. 426/74, 522, 573, 426/575, 580, 588, 590, 660

[56] References Cited

U.S. PATENT DOCUMENTS

| | | | |
|---|---|---|---|
| 2,594,439 | 4/1952 | Baker et al. | 426/577 |
| 2,871,123 | 1/1959 | Bauer et al. | 99/54 |
| 4,180,595 | 12/1979 | Lauredan | 426/575 |
| 4,268,533 | 5/1981 | Williams et al. | 426/577 |
| 4,701,329 | 10/1987 | Nelson et al. | 426/74 |
| 4,722,847 | 2/1988 | Heckert | 426/74 |
| 4,834,990 | 5/1989 | Amer | 426/74 |
| 4,840,614 | 6/1989 | Harada et al. | 426/580 |
| 4,851,243 | 7/1989 | Andersen et al. | 426/74 |
| 4,871,554 | 10/1989 | Kalala et al. | 426/74 |
| 4,919,963 | 4/1990 | Heckert | 426/599 |
| 5,550,232 | 8/1996 | Keating | 426/74 |
| 5,609,897 | 3/1997 | Chandler et al. | 426/73 |
| 5,855,936 | 1/1999 | Reddy et al. | 426/74 |

FOREIGN PATENT DOCUMENTS

| | | |
|---|---|---|
| 0709033 | 1/1996 | European Pat. Off. . |
| 411040 | 4/1991 | Germany . |
| 359162847 | 9/1984 | Japan . |
| 436166 | 2/1992 | Japan . |
| 5-238940 | 9/1993 | Japan . |
| 8-56567 | 3/1996 | Japan . |

OTHER PUBLICATIONS

Guamis–Lupez et al., "Calcium enrichment of skimmed milk given UHT Treatment"; 1996 Alimentaria, No. 271, p. 79–82.

*Primary Examiner*—Helen Pratt
*Attorney, Agent, or Firm*—Pennie & Edmonds LLP

[57] ABSTRACT

A fortified foodstuff comprising a fortifying amount of a balanced blend of calcium lactate and calcium carbonate stabilised with a source of glucuronic acid, and a process for its preparation which comprises mixing a balanced blend of calcium lactate and calcium carbonate, adding a source of glucuronic acid, and adding to the foodstuff.

17 Claims, No Drawings

FORTIFICATION OF FOODSTUFF

FIELD OF THE INVENTION

The present invention relates to the fortification of a foodstuff and more particularly to the fortification of a foodstuff with calcium.

BACKGROUND OF THE INVENTION

Calcium is an important element in human diets for adequate bone formation and maintenance as well as other metabolic functions, e.g. nerve transmission, blood clotting, proper cell function and muscle contraction. It is common practice to fortify food products with calcium sources, which are either insoluble or soluble at around neutral pH. Many of the calcium sources currently used for fortification which are insoluble or substantially insoluble at around neutral pH, e.g. calcium carbonate, calcium phosphates, calcium citrate and other organic or inorganic acid salts of calcium, result in precipitation and a chalky mouth feel. Other calcium sources, which are soluble or substantially soluble at around neutral pH such as calcium chloride, calcium hydroxide and a few organic acid salts of calcium, react with milk proteins resulting in undesirable coagulation and gelation.

It is also common practice to stabilize or reduce the sedimentation of the calcium and milk proteins in the milk beverages fortified with calcium sources by adding carrageenans, pectins and/or other gums, but such materials impart an undesirably high viscosity to milk. Protein destabilisation, e.g. coagulation and precipitation, is mainly attributed to free calcium ions in the system.

It would be highly desirable to have a calcium source to fortify milk beverages and other dairy based products without coagulation, gelation and sedimentation, with improved palatability.

In U.S. Ser. No. 08/822,447 now U.S. Pat. No. 5,855,936 there is claimed a fortified foodstuff comprising a fortifying amount of a blend of calcium salts balanced with soluble and insoluble salts stabilized with a source of glucuronic acid. Examples of the soluble calcium salts are calcium lactate and calcium gluconate, calcium glycerophosphate, calcium chloride, etc. Examples of the insoluble calcium salts are tricalcium phosphate, dicalcium phosphate, calcium citrate and calcium carbonate. The weight ratio of soluble to insoluble salts may be from 1:3 to 3:1 and preferably from 1.5:2.5 to 2.5:1.5. However, in the Examples tested for fortifying milk using calcium citrate and calcium phosphate as the insoluble calcium salts, slight sedimentation occurred during milk storage for two months under refrigerated conditions. Also, the use of tri-salt blends requires a large amount of water, as a result of which milk solids have to be adjusted, which cause additional technical and equipment problems (e.g., nonfat dry milk, liquifiers, pumps, more energy, etc). It is desirable to reduce the number of ingredients for easy handling in the factory. It should be also noted that calcium carbonate is less expensive and richer in calcium (40.04%) than a blend of tricalcium phosphate (38.76%) and calcium citrate (24.12%). In addition, we have found that unless the soluble salt in the balanced mixture is calcium lactate, bitterness and off-flavor were found in the milk.

SUMMARY OF THE INVENTION

We have surprisingly found that a balanced blend consisting solely of soluble calcium lactate and insoluble calcium carbonate stabilized with a source of glucuronic acid is capable of fortifying milk beverages and other dairy based products. This calcium fortified milk can survive the heat treatment (pasteurization, UHT pasteurization and UHT sterilization, autoclaving) and storage at refrigerated conditions without coagulation and sedimentation for a 2 month period. No bitterness or off-flavor were found in this calcium fortified milk.

According to the present invention, there is provided a fortified foodstuff comprising a fortifying amount of a balanced blend of calcium lactate and calcium carbonate stabilized with a source of glucuronic acid.

The ingredients can be added to the milk base individually or as a blend. The milk can then be ultrapasteurized without any additional pre-process (e.g., adjustment of solids) and pre-heat treatment.

DETAILED DESCRIPTION OF THE INVENTION

The weight ratio of calcium lactate to calcium carbonate may be from 1:2 to 3:1 and preferably from 1:1.7 to 1:1.9.

The foodstuff may be milk or dairy based products such as a milk beverage, e.g., chocolate milk, confectionery product, ice cream or other beverages such as juices. If desired, other minerals or vitamins may be present in the foodstuff.

The amount of the blend of calcium salts present in the fortified foodstuff may be from 0.05 to 5%, preferably from 0.1 to 1%, and more preferably from 0.2 to 0.4% by weight based on the weight of the foodstuff.

The source of glucuronic acid may be gum ghatti but is preferably gum arabic. The amount of gum arabic present in the fortified foodstuff may be from 0.05 to 2.5%, preferably from 0.1 to 1.0%, and more preferably from 0.2 to 0.5% by weight based on the weight of the foodstuff. Although not wishing to be bound by theory, we believe that the glucuronic acid residues in gum arabic aid in suspending calcium by ionic binding without contributing significantly to viscosity.

Advantageously, a carrageenan may be present which may be the lambda- or iota-form but is preferably kappa-carrageenan. The amount of carrageenan present in the fortified foodstuff may be from 0.005 to 0.1%, preferably from 0.0075 to 0.05%, and more preferably from 0.01 to 0.03% by weight based on the weight of the foodstuff.

The fortified foodstuff comprising a fortifying amount of a balanced blend of calcium lactate and calcium together with a source of glucuronic acid may be prepared by mixing of the balanced blend of calcium lactate and calcium carbonate, adding a source of glucuronic acid, and adding to the foodstuff.

The balanced blend of calcium lactate and calcium carbonate and the source of glucuronic acid may be added in the form of aqueous suspensions or as dry powders.

An alkaline agent may, if desired, be added to adjust the pH of the calcium fortified foodstuff. For instance, the pH of calcium fortified milk may be adjusted to 6.5–8.0 and preferably to 6.8–7.0: the pH of calcium fortified dairy based products may be adjusted to 6.0–8.0 and preferably to 6.5–7.0: the pH of calcium fortified ice cream products may be adjusted to 6.0–7.2 and preferably to 6.8–7.2: and the pH of calcium fortified beverages may be adjusted to 3.5–8.0 and preferably to 5.5–6.5. Any food grade alkaline agent may be used for neutralization, including but not limited to sodium hydroxide, potassium hydroxide, ammonia hydroxide, magnesium hydroxide, sodium carbonate, sodium bicarbonate, potassium carbonate, and potassium bicarbonate.

Advantageously, a carrageenan may be added to the foodstuff, preferably before the balanced blend of calcium lactate and calcium carbonate is added to the foodstuff. The carrageenan may also be added to the foodstuff in the form of an aqueous suspension or as a dry powder.

If desired, the balanced blend of calcium lactate and calcium carbonate, the source of glucuronic acid, and optionally the carrageenan, may be mixed together and added as a powder.

EXAMPLES

The following Examples further illustrate the present invention.

Example 1

Calcium fortified skim milk (Ca level: 50% RDA in 8 oz serving size)

16.5 g of kappa carrageenan and 275 g of gum Arabic were slowly added to 11 kg of skim milk in a liquifier under agitation and mixed for 5 minutes at high speed. Then 98 kg of skim milk was added to the liquifier under agitation.

126.5 g of calcium lactate pentahydrate, 216.7 g of micronized calcium carbonate and 110 g of potassium citrate were added to the milk with carrageenan and gum arabic under agitation, then speed of the liquifier was slowed. After 10 minutes of mixing, the pH of the calcium fortified milk was adjusted with 10% potassium hydroxide solution to 6.8–7.0.

The milk was preheated to 175° F., ultra high temperature (UHT) treated at 285° F. for 5 sec by steam injection, flash cooled to 175° F., and homogenized at 175° F. and a pressure of 2500/500 psi. The milk was cooled to 40° F., aseptically filled in 250 mL Tetra Brik Aseptic® packages (Tetra Pak Inc., Chicago Ill.) and stored in a refrigerator at 35–45° F. for 10 weeks.

After 10 weeks the product was judged by a taste panel of 10 people, who found the milk to be stable, without sedimentation or coagulation, and of good flavor.

Example 2

Calcium fortified 2% fat chocolate milk (Ca level: 50% RDA in 8 oz serving size)

16.5 g of kappa carrageenan and 275 g of gum arabic were slowly added to 50 kg of 2% fat milk in a liquifier under agitation and was mixed for 5 minutes at high speed. Then 47 kg of 2% fat milk were added to the liquifier under agitatation.

126.5 g of calcium lactate pentahydrate, 216.7 g of micronized calcium carbonate, 110 g of potassium citrate, 283 g of nonfat dry milk, 1.0 kg of blend of cocoa, salt and vanillin, and then 10.6 kg of high fructose corn syrup were added to the milk under agitation. The speed of the liquifier was slowed and after 10 minutes of mixing the pH of the calcium fortified milk was adjusted with 10% potassium hydroxide solution to 6.8–7.0.

The milk was preheated to 175° F., ultra high temperature (UHT) treated at 285° F. for 5 sec by steam injection, flash cooled to 175° F. and homogenized at 175° F. and a pressure of 2500/500 psi. The milk was cooled to 40° F., aseptically filled in 250 mL Tetra Brik Aseptic® packages (Tetra Pak Inc., Chicago Ill.) and stored in a refrigerator at 35–45° F. for 10 weeks.

After 10 weeks the product was judged by a taste panel of 10 people which found the milk to be stable, without sedimentation or coagulation, and of good flavor.

Example 3

Calcium fortified 2% fat milk with minerals and vitamins (Ca level: 50% RDA in 8 oz serving size)

16.5 g of kappa carrageenan and 275 g of gum Arabic were slowly added to 50 kg of 2% fat milk in a liquifier under agitation and was mixed for 5 minutes at high speed. Then 59 kg of 2% fat milk was added to the liquifier under agitation.

126.5 g of calcium lactate pentahydrate, 216.7 g of micronized calcium carbonate, 110 g of potassium citrate and 42.6 g of mineral premix (magnesium phosphate, zinc oxide, potassium iodide and manganese sulfate monohydrate) were added to the milk under agitation. The speed of the liquifier was slowed and after 10 minutes of mixing the pH of the calcium fortified milk was adjusted with 10% potassium hydroxide solution to 6.8–7.0. Then 13.6 g of vitamin premix (vitamin A palmitate, vitamin D, vitamin E acetate, vitamin K, thiamine mononitrate, niacinamid, pyrodoxine hydrochloride, cyancobalamin B12, calcium pantothenate, boitin, riboflavin) was added under agitation.

The milk was preheated to 175° F., ultra high temperature (UHT) treated at 285° F. for 5 sec by steam injection, flash cooled to 175° F., and homogenized at 175° F. and a pressure of 2500/500 psi. The milk was cooled to 40° F., aseptically filled in 250 mL Tetra Brik Aseptic® packages (Tetra Pak Inc., Chicago Ill.) and stored in a refrigerator at 35–45° F. for 10 weeks.

After 10 weeks the product was judged by a taste panel of 10 people, which found the milk to be stable, without sedimentation or coagulation, and of good flavor.

Example 4

Calcium fortified 2% fat chocolate milk with minerals and vitamins (Ca level: 50% RDA in 8 oz serving size)

A similar procedure to that described in Example 2 is followed but also using 16 minerals and vitamins.

The milk was preheated to 175° F., ultra high temperature (UHT) treated at 285° F. for 5 sec by steam injection, flash cooled to 175° F. and homogenized at 175° F. and a pressure of 2500/500 psi. The milk was cooled to 40° F., aseptically filled in 250 mL Tetra Brik Aseptic® packages (Tetra Pak Inc., Chicago Ill.) and stored in a refrigerator at 35–45° F. for 10 weeks.

After 10 weeks the product was judged by a taste panel of 10 people which found the milk to be stable, without sedimentation or coagulation, and of good flavor.

Example 5

Calcium fortified skim milk (Ca level: 50% RDA in 8 oz serving size)

0.165 g of kappa carrageenan and 2.75 g of gum Arabic were slowly added to 110 g of skim milk in a liquifier under agitation and was mixed for 5 minutes at high speed. Then 980 g of skim milk was added to the liquifier under agitation.

1.265 g of calcium lactate pentahydrate, 2.167 g of micronized calcium carbonate and 1.10 g of potassium citrate were added to the milk with carrageenan and gum arabic under agitation, then the speed of the liquifier was slowed. After 10 minutes of mixing, the pH of the calcium fortified milk was adjusted with 10% potassium hydroxide solution to 6.8–7.0.

The milk was preheated to 175° F. and homogenized at a pressure of 2500/500 psi, filled in 125 mL glass jars and then autoclaved at 250° F. for 3 min, cooled and stored at room temperature.

After 10 weeks the product was judged by a taste panel of 5 people, which found the milk to be stable, without sedimentation or coagulation.

Comparative Example A

A similar procedure to that described in Example 1 is followed but using calcium citrate instead of calcium carbonate.

The milk was stable during the processing but significant sedimentation occurred upon storage at 2° to 5° C. after 5 weeks.

Comparative Example B

A similar procedure to that described in Example 1 is followed but using calcium chloride instead of calcium lactate.

The milk had a significant bitterness and off-flavor.

We claim:

1. A fortified foodstuff containing a fortifying amount of a calcium complex consisting essentially of a balanced blend of calcium lactate and calcium carbonate which blend is stabilized with a source of glucuronic acid, wherein the foodstuff does not exhibit sedimentation of the complex for at least 10 weeks.

2. A fortified foodstuff according to claim 1 wherein the weight ratio of calcium lactate to calcium carbonate is from 1:2 to 3:1.

3. A fortified foodstuff according to claim 1 wherein the foodstuff is milk or a dairy based product, a confectionery product, ice cream or a beverage.

4. A fortified foodstuff according to claim 1 wherein other minerals or vitamins may be present in the foodstuff.

5. A fortified foodstuff according to claim 1 wherein the amount of the balanced blend of calcium lactate and calcium carbonate present in the fortified foodstuff is from 0.05 to 5% by weight based on the weight of the foodstuff.

6. A fortified foodstuff according to claim 1 wherein the source of glucuronic acid is gum Arabic.

7. A fortified foodstuff according to claim 6 wherein the amount of gum Arabic present in the fortified foodstuff is from 0.05 to 2.5% by weight based on the weight of the foodstuff.

8. A fortified foodstuff according to claim 1 wherein a carrageenan is present.

9. A fortified foodstuff according to claim 8 wherein the amount of carrageenan present in the fortified foodstuff is from 0.005 to 0.1% by weight based on the weight of the foodstuff.

10. A process for preparing a fortified foodstuff containing a fortifying amount of a calcium complex consisting essentially of a balanced blend of calcium lactate and calcium carbonate together with a source of glucuronic acid which comprises mixing the calcium lactate and calcium carbonate to form a balanced blend, adding a source of glucuronic acid in an amount sufficient to stabilize the blend, and adding the stabilized, balanced blend calcium complex to the foodstuff in an amount sufficient to fortify the foodstuff, wherein the foodstuff does not exhibit sedimentation of the complex for at least 10 weeks.

11. A process according to claim 10 wherein the balanced blend of calcium lactate and calcium carbonate and the source of glucuronic acid are added in the form of aqueous suspensions or as dry powders.

12. A process according to claim 11 wherein a carrageenan is added to the foodstuff.

13. A process according to claim 12 wherein the carrageenan is added to the foodstuff in the form of an aqueous suspension or as a dry powder.

14. A process according to claim 10 wherein the balanced blend of calcium lactate and calcium carbonate, the source of glucuronic acid, and optionally a carrageenan, is mixed and added as a powder.

15. A fortified foodstuff containing a fortifying amount of a calcium complex consisting of a blend of calcium lactate and calcium carbonate, which blend is a balanced blend and stabilized with a source of glucuronic acid so as to avoid sedimentation of the complex in the foodstuff for at least 10 weeks.

16. A fortified foodstuff according to claim 15 wherein the weight ratio of calcium lactate to calcium carbonate is from 1:2 to 3:1.

17. A fortified foodstuff according to claim 16 wherein the balanced blend of calcium lactate and calcium carbonate makes up from 0.05 to 5 percent by weight of the foodstuff.

* * * * *